United States Patent [19]
Weiss

[11] Patent Number: 5,505,377
[45] Date of Patent: Apr. 9, 1996

[54] AUTOMATIC WALL THERMOSTAT

[75] Inventor: John Weiss, Amityville, N.Y.

[73] Assignee: Micro Weiss Electronics, Inc., West Babylon, N.Y.

[21] Appl. No.: 247,033

[22] Filed: May 20, 1994

Related U.S. Application Data

[63] Continuation-in-part of Ser. No. 245,603, May 18, 1994, abandoned.

[51] Int. Cl.[6] ................................................ G05D 23/00
[52] U.S. Cl. .......................... 236/47; 165/12; 364/557; 236/94
[58] Field of Search ........................... 236/46 R, 47, 236/94; 165/12; 364/505, 557

[56] References Cited

U.S. PATENT DOCUMENTS 4,318,508  3/1982  Glasgow et al. .................... 236/47
4,621,336  11/1986  Brown .................................. 236/46 R
5,156,011  10/1992  Shim ................................... 236/47 X

*Primary Examiner*—William E. Wayner
*Attorney, Agent, or Firm*—Hoffmann & Baron

[57] ABSTRACT

An automatic thermostat which automatically reprograms itself after a power outage without the need of a backup battery or other storage device includes a temperature sensor, a set temperature potentiometer, a setback temperature potentiometer and an ambient light sensor. The thermostat also includes a microprocessor which is responsive to signals from the temperature sensor, the set and setback temperature potentiometers and the ambient light sensor. The microprocessor controls a display which displays the set temperature, the setback temperature and the actual temperature. A power outage detector detects when there is a power outage and triggers the microprocessor to reprogram itself by rereading the signals from set temperature potentiometer and the setback temperature potentiometer. A relay is controlled by the microprocessor to selectively provide power to a heating or air conditioning unit.

16 Claims, 11 Drawing Sheets

AUTOMATIC WALL THERMOSTAT

CROSS REFERENCE TO RELATED APPLICATIONS

This is a continuation-in-part of application Ser. No. 08/245,603 entitled "Automatic Wall Thermostat" filed on May 18, 1994, now abandoned.

BACKGROUND OF THE INVENTION

1. Field of the Invention

This invention relates to thermostats for controlling heating or air conditioning units, and more particularly relates to electronic wall thermostats for controlling the temperature in a room.

2. Description of the prior art

The use of electronic wall thermostats is well established and can be classified as either the low voltage switching type, typically 24 volts AC, for operating hydronic, steam or hot air systems, or line voltage switching types, for switching power to electric or other types of heaters.

Prior to the use of digital electronics in wall thermostats, conventional wall thermostats were typically of the bimetallic type utilizing the differential expansion of dissimilar bonded metals to actuate a switch, such as by tilting a mercury contact bulb switch. The inherent mass of the bimetallics prevents the conventional thermostat from quickly responding to temperature changes. As a result, large temperature swings occur.

Digital electronic thermostats that employ low mass sensors are able to respond more quickly to temperature changes and cycle the heating on and off to effect a lower room temperature differential and improve the comfort level. Without the relatively large temperature swings associated with bimetallic thermostats, energy savings using the digital electronic thermostats are greatly increased.

Significant energy savings may be realized by using day/night settings, reducing the room temperature at night or during periods of low usage. In some devices, a combination clock-thermostat is used to turn the heating setting back for expected low usage times, such as at night. To the knowledge of the inventor herein, most clock-thermostats use batteries to operate the clock of the thermostat. The batteries also provide power for the programming the thermostat and memory storage.

Some problems arise from low battery conditions beyond the obvious need to remember to periodically change the batteries. A low voltage condition can affect the calibration of the thermostat and eventually cause a false or ambiguous operation. This condition is discussed in U.S. Pat. No. 5,196,781, which issued to Robert Jamieson and John Weiss, the disclosure of which is incorporated herein by reference.

To avoid temperature control problems associated with battery aging or weak batteries, most low voltage thermostats still rely on bimetals for temperature controls and use the digital electronics for the clock and programming functions. Thermostats that depend on line voltage or a lower voltage as the power source may lose the temperature set and setback program during a brief power interruption, even if this interruption is only one or two seconds in duration. If line voltage thermostats use power storage devices, such as capacitors or battery back ups, then faulty operation or lock up may occur if the power is restored from a low or ambiguous voltage state.

OBJECTS AND SUMMARY OF THE INVENTION

It is an object of the present invention to provide an automatic thermostat which retains its set and setback temperature settings after a power outage.

It is another object of the present invention to provide an automatic thermostat which requires no battery or other storage device to retain the programmed temperature settings.

It is a further object of the present invention to provide an automatic thermostat which is easily programmable by the user.

It is yet another object of the present invention to provide an automatic thermostat which automatically reverts to a setback temperature at low ambient light conditions.

It is still another object of the present invention to provide an automatic thermostat which may be controlled for different ambient light conditions.

It is yet a further object of the present invention to provide an automatic thermostat which provides user friendly, programming information to the user during the programming process.

It is still a further object of the present invention to provide an automatic thermostat which overcomes the inherent disadvantages of conventional thermostats.

In accordance with one form of the present invention, an automatic thermostat includes a temperature sensor, a first potentiometer for setting a set temperature, and a second potentiometer for setting a setback temperature. The temperature sensor provides a temperature sensor signal which corresponds to the actual temperature which it senses. The set temperature potentiometer and the setback temperature potentiometer provide a set temperature signal and a setback temperature signal, respectively.

The automatic thermostat further includes a microprocessor. The microprocessor is responsive to the set and setback temperature signals and to the temperature sensor signal, and generates at least first and second output signals in response to these signals.

The automatic thermostat further includes a power outage detector. The power outage detector generates an output signal in response to a power outage. This output signal may be used to selectively power the microprocessor or the set and setback temperature controls or to reset the microprocessor after a power outage.

The automatic thermostat of the present invention further includes a display. The display is responsive to the first output signal from the microprocessor and displays information corresponding to the set temperature, the setback temperature and the actual temperature in response to the first output signal.

The automatic thermostat also includes a relay, electronic proportional control switching device or other device for controlling power to a heating or air conditioning unit. The relay or other device is responsive to the second output signal from the microprocessor and selectively controls power to a heating or air conditioning unit in response to the second output signal.

The microprocessor is further responsive to the output signal from the power outage detector and automatically reprograms itself in response to this signal. It reprograms itself by again looking at the signals from the set temperature potentiometer and the setback temperature potentiometer. If the potentiometers have not been changed by the user, the microprocessor will return to the same set and setback temperature values and again restore these values in its memory.

The automatic thermostat of the present invention may also include an ambient light sensor. The ambient light sensor provides an ambient light signal corresponding to a sensed ambient light level. The microprocessor is responsive to the ambient light signal and provides the second output signal to the power control device in response to the ambient light signal so that power to the heating or air conditioning unit is selectively provided in response to the sensed ambient light level.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
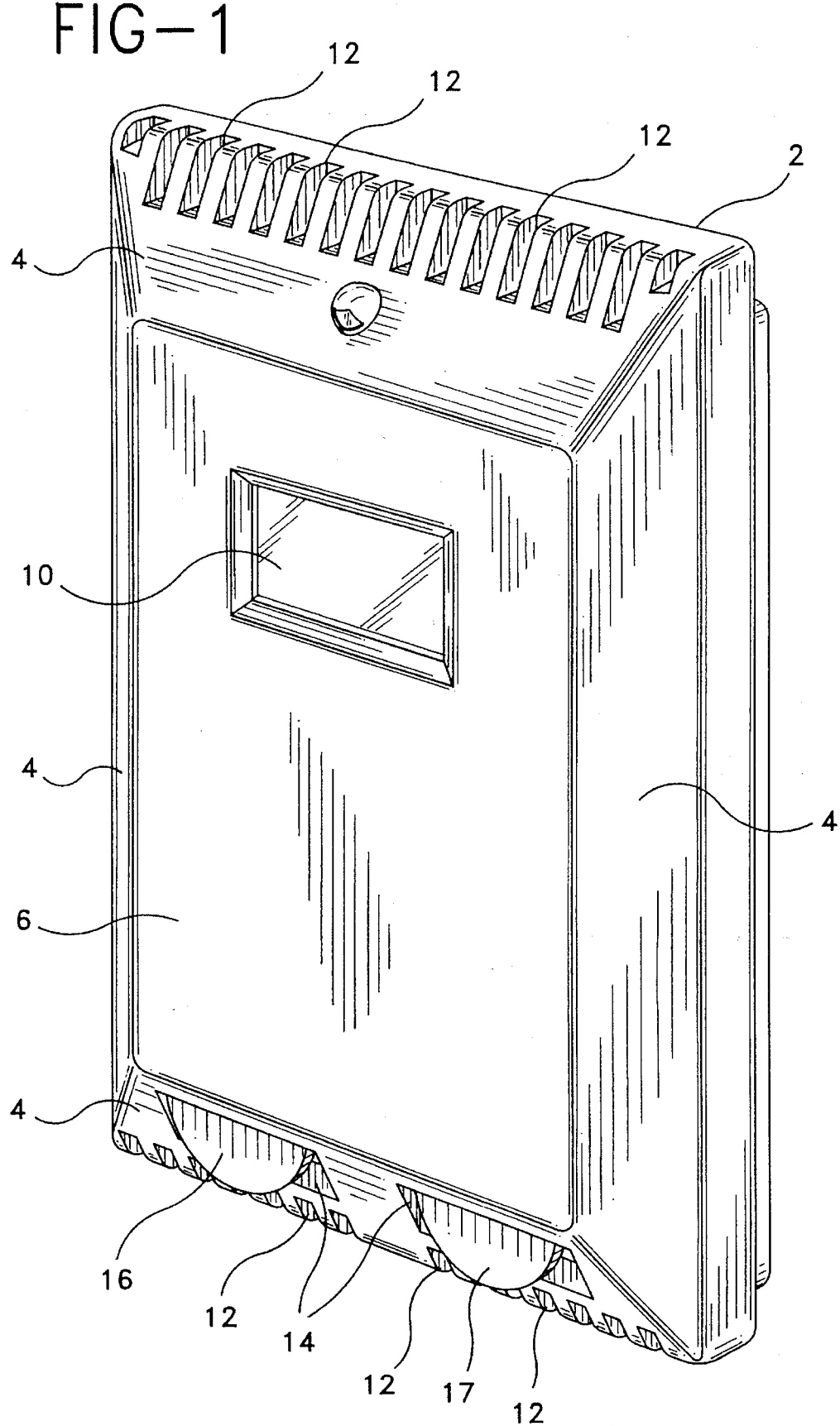
FIG. 1 is a perspective view of an automatic thermostat mountable on a wall and formed in accordance with one form of the present invention.

Referring initially to FIG. 1 of the drawings, it will be seen that an automatic thermostat formed in accordance with one form of the present invention is particularly adapted for mounting on the wall of a room and for controlling a heating unit in the room or a separate heating unit elsewhere. The automatic thermostat of the present invention includes a housing 2 having bevelled sidewalls 4, all of which converge to a flat front wall 6. The front wall 6 of the thermostat includes an opening formed through its thickness through which a display 10 of the thermostat may be viewed by the operator. The opposite top and bottom bevelled sidewalls further include a plurality of parallel, spaced apart slots 12 formed through their thicknesses. The slots 12 are provided so that convection currents of air may pass through the interior of the thermostat defined by the housing 2. In this way, a temperature sensor which is internally mounted in the thermostat will be exposed to ambient room temperature conditions and will react accordingly.

The housing 2 of the thermostat includes two additional openings 14 formed through the thickness of the bottom bevelled sidewall and through which extend the dials or knobs 16,17 of two potentiometers used in the circuit of the automatic thermostat. The knobs 16,17 are exposed through the housing so that the user may easily turn each potentiometer to adjust the set temperature and setback temperature of the thermostat.

Figure 2:
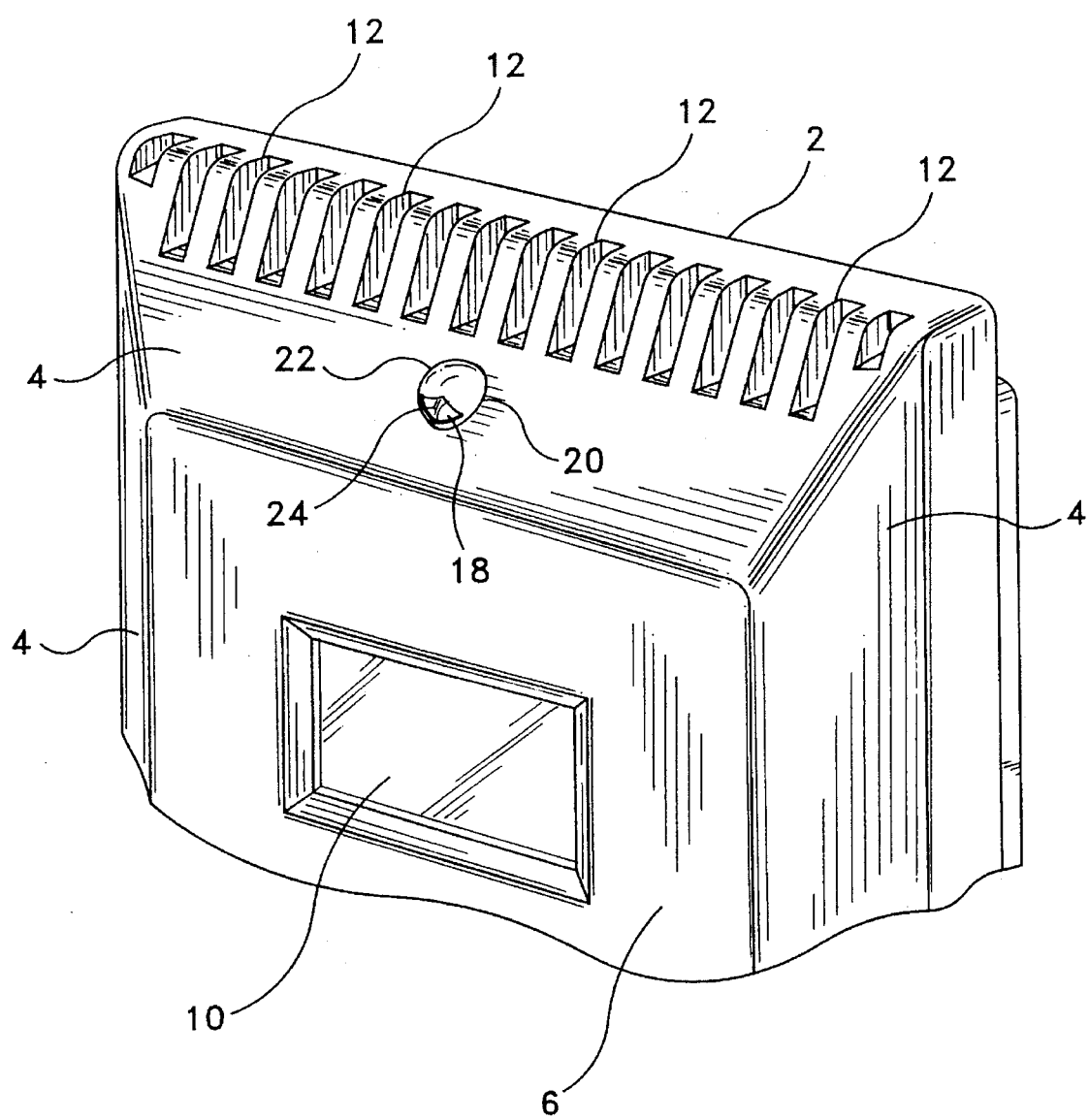
FIG. 2 is an enlarged perspective view of a portion of the thermostat shown in FIG. 1.

The automatic thermostat of the present invention further preferably includes a photosensor 18, as more clearly shown in FIG. 2 of the drawings. The photosensor is aligned with an opening 20 formed in the top bevelled sidewall 4 of the housing so that it is exposed to the ambient light conditions in the room. Mounted on the housing over the opening 20 is a rotatable cover or hood 22, the hood 22 having a window 24 formed through its thickness. The hood 22 may be rotated on the housing so that the window 24 may be directed toward or away from a source of light, such as a window or internal lighting, and thereby control the sensitivity of the photosensor and so that the thermostat will act responsively and in a desired manner to the ambient light conditions in the room. As will be described, the light sensor 18 is provided so that the thermostat reacts to the ambient light conditions in the room and automatically sets back the temperature in the room to the desired setback temperature at night or when there is a low light level in the room, such as when the room is not being used, and automatically reverts back to a higher, set temperature programmed by the operator during daytime hours or when the room is being used, such as when the lights in the room are on. Although in the preferred embodiment a rotatable hood 22 is described, it is envisioned that the thermostat of the present invention may be provided with a slidable cover (not shown) aligned with the photosensor opening 20 to control the amount of light received by the photosensor 18 and thus its sensitivity.

Figure 3:
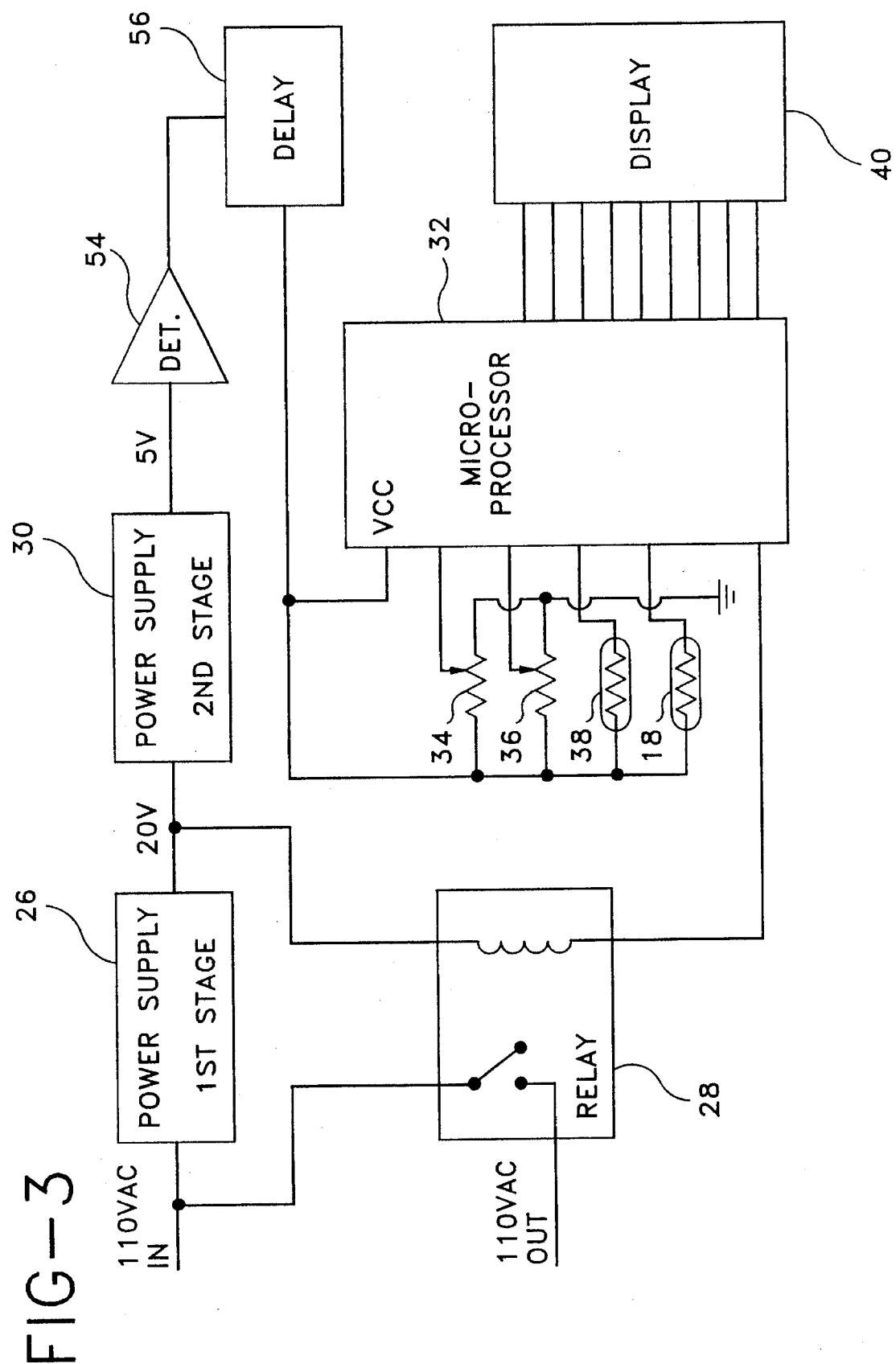
FIG. 3 is a block diagram of one form of the circuit of the automatic thermostat of the present invention.

FIG. 3 is a block diagram of one form of a circuit for use in the automatic thermostat of the present invention. The circuit includes a first power supply 26 which is powered from the line voltage (for example, 110 volts AC) and which generates a particular voltage, for example 20 volts, to selectively energize a relay 28 or other device for controlling the power to a heating unit.

The circuit also includes a second power supply 30 which, from the 20 volts generated by the first power supply 26, generates a lower voltage (for example, 5 volts) to provide power to the various electronic components and integrated circuits of the thermostat circuit.

The automatic thermostat of the present invention also includes a microprocessor 32 and a number of controls which provide information in the form of signals to the microprocessor. The microprocessor 32 controls the operation of the thermostat and, as will be explained, will automatically reprogram itself if a power outage occurs.

Preferably, there are four controls which provide information in the form of signals to the microprocessor 32. The first control is a potentiometer 34, as mentioned previously, used for setting a set temperature. The potentiometer 34 is connected to the 5 volt supply 30 and, therefore, provides a set temperature signal in the form of a variable DC voltage to a signal input of the microprocessor 32. The DC level of the signal may be adjusted by the operator of the thermostat by turning the knob 16 affixed to the wiper of the potentiometer 34.

The second control is also a potentiometer 36, and is also connected to the five volt power supply 30 to provide an adjustable DC voltage to another signal input of the microprocessor 32, which DC voltage represents a setback temperature signal. This potentiometer 36 is used for setting a setback temperature, which may be the actual desired temperature or the number of degrees in temperature which the user would like to set back from the daytime "set" temperature during nighttime or hours when the room is not in use. The DC level of the signal is adjusted by turning the knob 17 affixed to the wiper of potentiometer 36.

The third control is a temperature sensor 38. The temperature sensor 38 may be in the form of a thermistor which is coupled to the five volt power supply 30 and which provides a temperature sensor signal in the form of an adjustable DC voltage to the microprocessor 32 on another signal input, which temperature sensor 38 corresponds to the sensed actual temperature in the room.

The fourth control which is preferably included in the automatic thermostat of the present invention is an ambient light sensor 18. The ambient light sensor 18 may be in the form of a photocell or phototransistor which is connected to the five volt supply 30 and to the microprocessor 32 on another signal input and which provides an ambient light signal in the form of an adjustable DC voltage to the microprocessor. The ambient light signal corresponds to a sensed ambient light level in the room, which is detected by the photocell, phototransistor or the like.

As shown in FIG. 3, the microprocessor 32 is coupled to the relay 28 and, in effect, provides a signal to the relay to energize or de-energize the relay coil. The line voltage passes through the contacts of the relay 28 and thus is controlled by the microprocessor 32 in response to the signals provided by the set temperature potentiometer 34, setback temperature potentiometer 36, temperature sensor 38 and light sensor 18. In actuality, the microprocessor 32 selectively allows current to pass through the relay coil to activate or de-activate the relay 28, although this should be understood that this is effectively the same as the microprocessor providing an output signal to the relay to control the activation of the relay.

The relay 28 controls the power to a heating unit. It is responsive to the microprocessor 32 to selectively control the power provided to the heating unit, whether the heating unit is in the form of an electric radiator in the same room as the thermostat, or a basement boiler controlling the temperature of several rooms in the building. The relay 28 is preferably mounted on the back wall of the thermostat housing 2, although it is envisioned to be within the scope of the invention to have the relay remotely located from the thermostat, as is true of the first or second power supplies 26,30.

Any suitable microprocessor 32 may be used in the automatic thermostat of the present invention. However, the preferred microprocessor to be used is Part No. HD4074224SO3 manufactured by Hitachi Corporation. This particular microprocessor is a compact, four bit CMOS microcontroller. It has 4K of memory in an EPROM (Erasable Programmable Read Only Memory), includes a watchdog timer and has a resistor isolator and an LCD (Liquid Crystal Display) driver. If such a microprocessor is used, the signals from the four controls are preferably time multiplexed into a single data input on the microcontroller 32, as is known to one skilled in the art from the specifications of this particular microcontroller.

The automatic thermostat of the present invention also includes a display 40. The display 40 is preferably an LCD (Liquid Crystal Display), and is responsive to another output signal or plurality of signals from the microprocessor 32. The display 40 is used for displaying information corresponding to the set temperature, setback temperature, and actual temperature in response to the output signals from the microprocessor.

Figure 7:
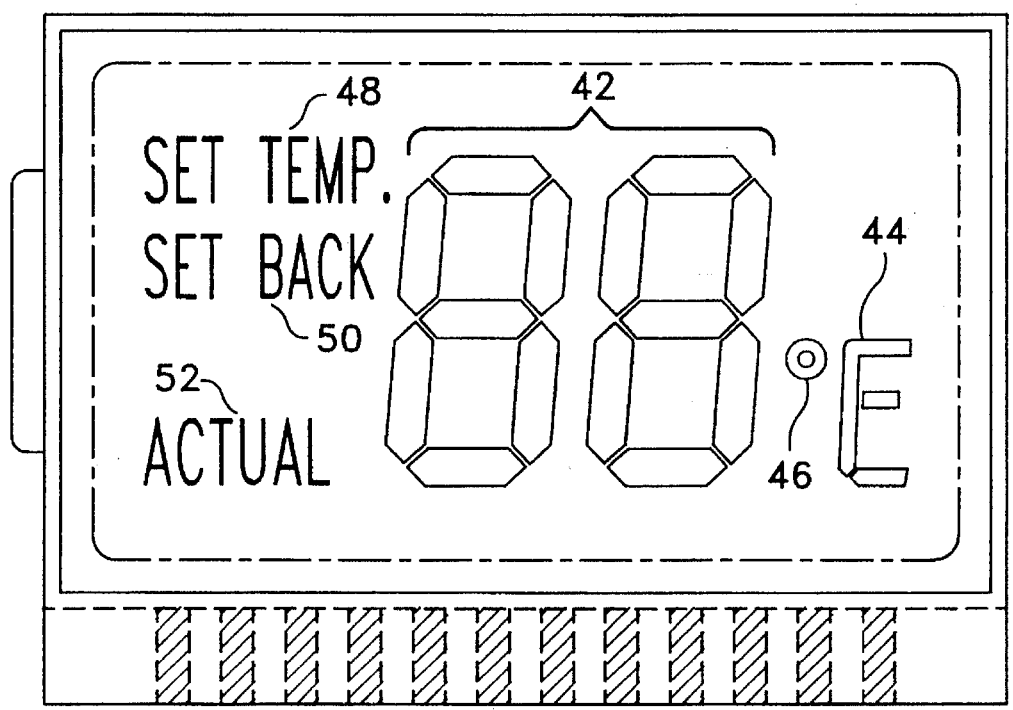
FIG. 7 is a front view of a display used in accordance with the automatic thermostat of the present invention.

One form of the LCD display 40 which is preferably used with the present invention is shown in FIG. 7 of the drawings. A segmented two digit display 42 is used to display the set temperature, such as 72°, the setback temperature, such as 15° (the set temperature of 72° is set back 15° by the setback temperature setting), and further includes segments 44 which indicate whether the temperatures displayed are in fahrenheit (F) or centigrade (C.). A degree (°) segment 46 is also provided.

The display 40 also includes a "set temp" indicator 48, "setback" indicator 50 and an "actual" indicator 52. Each of these indicators 48–52 may be selectively energized by the microprocessor to indicate whether the temperature displayed by the two digit display 42 refers to the set temperature, setback temperature or the actual room temperature.

As mentioned previously, the automatic thermostat of the present invention will automatically reset itself to the original set and setback temperatures programmed by the user if there is a power outage. For this purpose, a power outage detector 54 is provided. The power outage detector 54 is preferably coupled to the five volt power supply 30 and thus detects when there is a power outage. The detector 54 will generate an output signal in response to a power outage. The microprocessor 32 is responsive to the output signal from the power outage detector 54 and automatically reprograms itself in response to the signal and in further response to the set temperature signal and setback temperature signal.

FIG. 3 shows one embodiment of the present invention where the power outage detector 54 provides the power (i.e., approximately 5 volts) to the various controls 18,34,36,38 and to the VCC (voltage) input of the microprocessor 32. When a power outage occurs, the outage is detected by the detector 54, and the detector interrupts power to the controls and/or the microprocessor 32. When power is restored, it is detected by the detector 54, which now provides the power to the controls and to the microprocessor.

Preferably, the thermostat circuit also includes a delay circuit 56 which is coupled to the output of the power outage detector 54. The delay circuit 56 delays the output signal (i.e., the 5 volts supplied by the detector) and provides a delayed signal (i.e., 5 volts) to the controls 18,34,36,38 and the microprocessor 32. By delaying the power to the controls and the microprocessor, the microprocessor will always be in an unambiguous state, and the controls will provide unambiguous signals to the microprocessor when the microprocessor is powered up. This circuit is suitable for use with microprocessors that may not include a separate Reset input. When the microprocessor is powered up in this manner, it will automatically reintialize its program (i.e., the program counter is set to zero and all the values in its memory are cleared). Accordingly, the microprocessor 32 will reprogram itself after being powered up and will look to the controls to determine what the temperature, light conditions and set points are.

Figure 4:
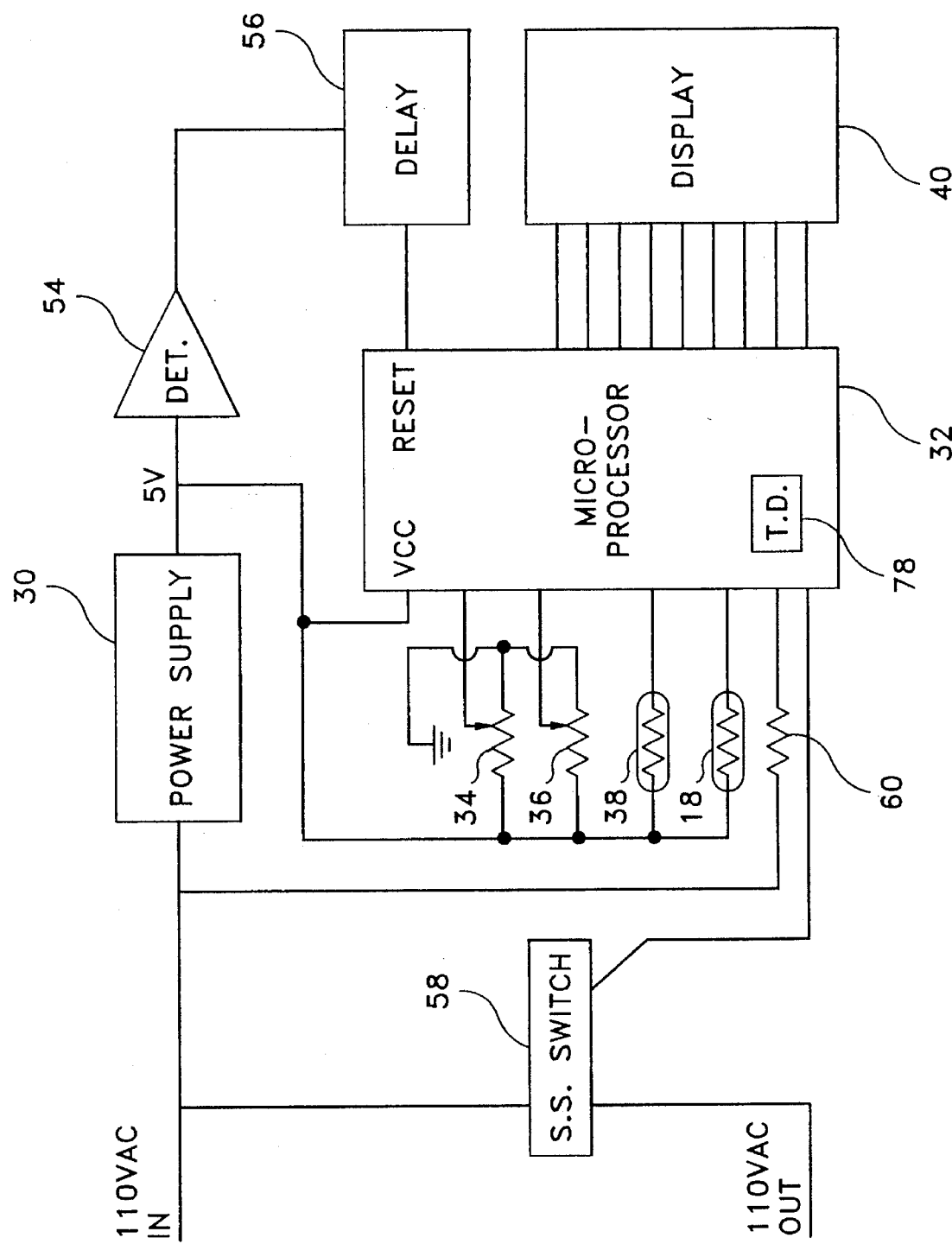
FIG. 4 is a block diagram of another form of the circuit of the automatic thermostat of the present invention.

FIG. 4 shows another form of a circuit for use with the thermostat of the present invention. In the embodiment shown in FIG. 4, power is always supplied to the controls 18,34,36,38 and the microprocessor 32 from the 5 volt power supply 30. The output signal from the power outage detector 54 is provided to the Reset input of the microprocessor 32. A delay circuit 56 connected between the output of the power outage detector 54 and the Reset input of the microprocessor 32 is also preferably used.

With the embodiment shown in FIG. 4, when a power outage occurs, power is lost to the controls and the microprocessor. When power is restored, the controls and microprocessor are powered up directly from the 5 volt power supply 30 rather quickly. The power outage detector 54 detects when power is restored and provides an output signal in response. The output signal is delayed by the delay circuit 56, which delayed signal is provided to the Reset input of the microprocessor. In this way, the microprocessor 32, which has already been powered up, can recognize the delayed signal from the power outage detector 54 it receives on its Reset input, and will reprogram itself by again looking at the signals from the controls 18,34,36,38 in response to the delayed signal from the power outage detector. Accordingly, in the embodiment shown in FIG. 4 and the embodiment shown in FIG. 3, no back up battery or storage device is necessary, as the microprocessor 32 will reprogram itself with the signals from the controls and load the corresponding data into its memory.

The embodiment shown in FIG. 4 is similar to that shown in FIG. 3 except for a few differences. The first difference is the connection of the power outage detector 54 and the power supply 30 to the controls 18,34-38 and to the microprocessor 32. Another difference is that the 20 volt power supply 26 is eliminated and the 5 volt power supply 30 is powered directly from the line voltage. A third difference is the use a solid state switch 58, such as a triac, in substitution for the relay 28 shown in FIG. 3, to selectively control power to the heating unit. The solid state switch 58 is controlled by the microprocessor 32, which provides an output signal to the solid state switch to energize or de-energize it so that the line current may pass through the switch 58 to the heating unit. The solid state switch 58 may be preferable over a relay, especially if it is desired to provide electronic proportional control to the heating unit.

More specifically in regard to proportional heating control, the microprocessor 32 receives a portion of the line voltage through a high impedance resistor 60 on one of its inputs and acts as a zero crossing detector. The microprocessor 32 may be programmed to change the duty cycle of the line current which passes through the solid state switch 58 to whatever is desired by controlling the solid state switch which is carried out by adjusting the output signal provided to the switch. Accordingly, the solid state switch 58 acts as an electronic proportional control switching device to provide a predetermined amount of power to the heating unit in response to the output signal from the microprocessor 32.

Figure 5:
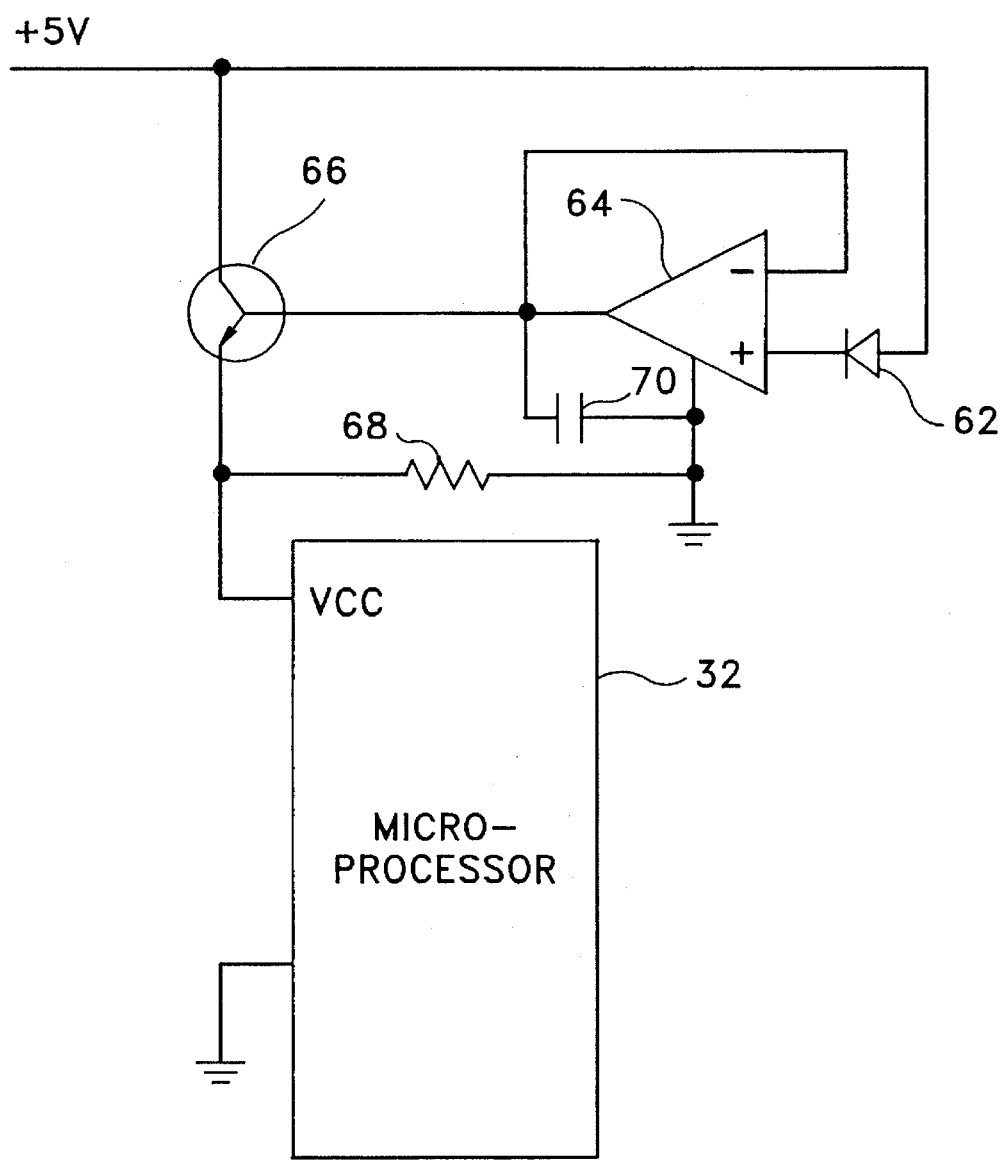
FIG. 5 is a schematic diagram of a portion of the circuit shown in FIG. 3.

FIG. 5 illustrates one form of the power outage detector 54 used in the circuit shown in FIG. 3. The power outage detector includes a diode 62 whose anode is coupled to the 5 volt supply 30 and whose cathode is provided to the input of an operational amplifier 64. The operational amplifier 64 is configured as a non-inverting buffer amplifier, whose output is provided to the base of an NPN transistor 66. The emitter of the transistor 66 is provided to the power (VCC) input of the microprocessor 32 and to the controls 18,34-38. The collector of the transistor 66 is coupled to the 5 volt power supply 30. A resistor 68 connected between the emitter of the transistor 66 and ground is provided as a current path and to ensure the proper voltage drop seen at the VCC input of the microprocessor 32. A capacitor 70 is added between the output of the operational amplifier 64 and ground to delay the output signal provided to the base of the transistor 66 and therefore delay the powering up of the microprocessor 32 and controls 18,34-38. The diode 62 before the input of the operational amplifier 64 is provided to ensure that the transistor 66 remains cut off and nonconductive at low (for example, 0.5 volt) voltage levels.

When power is restored, 5 volts from the power supply 30 is provided to the input of the operational amplifier 64 through the diode 62, and the amplifier provides an output signal, delayed by the capacitor 70, to the transistor 66 to turn the transistor on. When the transistor 66 turns on, it provides power to the microprocessor 32 and to the controls 18,34-38. In response, the microprocessor 32 will reprogram itself and look to the controls for the set temperature, setback temperature, actual temperature and ambient light signals.

Figure 6:
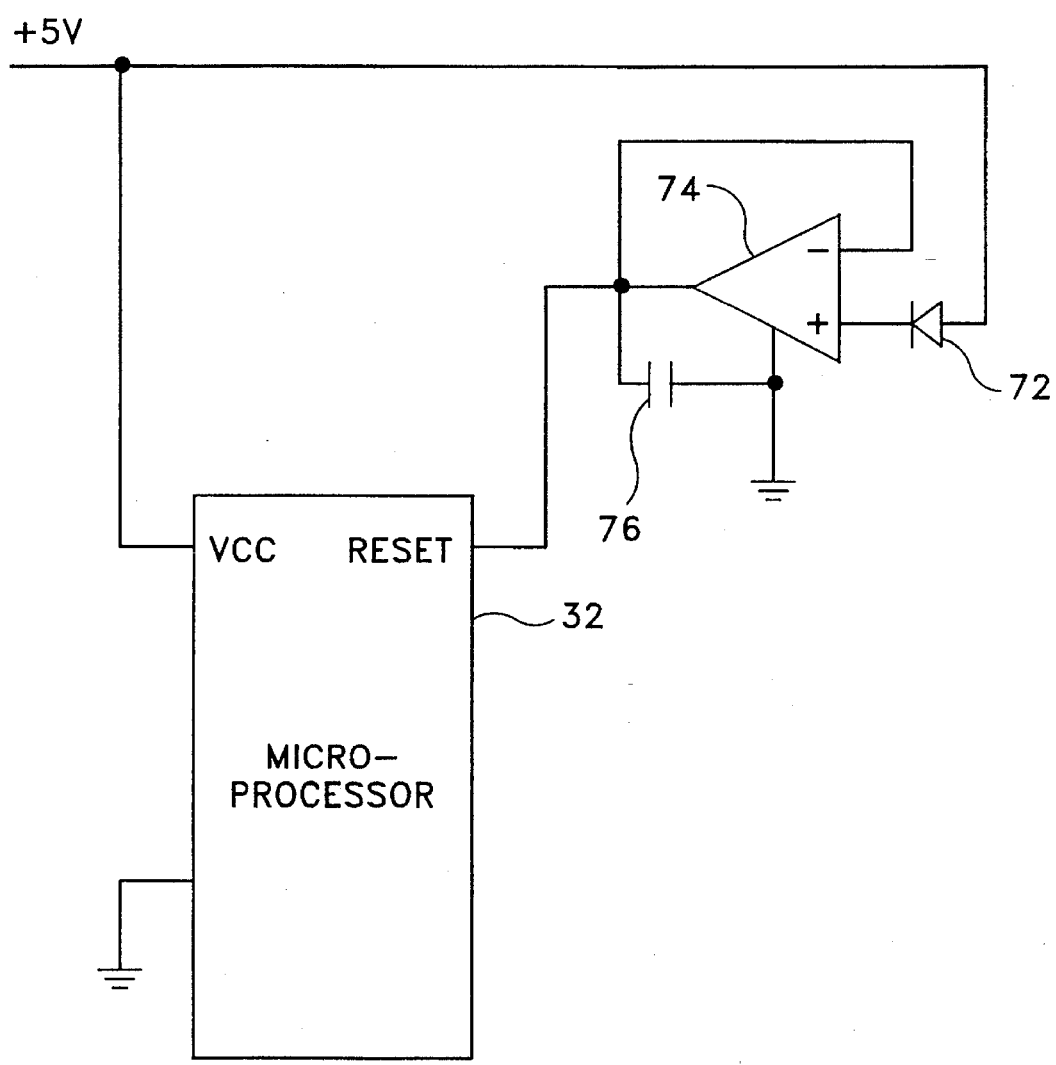
FIG. 6 is a schematic diagram of a portion of the circuit shown in FIG. 4.

FIG. 6 illustrates a circuit which may be used for the power outage detector 54 shown in the circuit of FIG. 4. The power outage circuit shown in FIG. 6, like the circuit shown in FIG. 5, includes a diode 72 coupled to the 5 volt supply 30 and to the input of an operational amplifier 74 which is configured as non-inverting buffer amplifier, whose output signal is provided to the Reset input of the microprocessor 32. Again, as in FIG. 5, the embodiment of FIG. 6 delays the output signal provided by the amplifier 74 to the microprocessor 32 by using a capacitor 76 coupled between ground and the output of the amplifier.

With the embodiment shown in FIG. 6, after power has been restored, the 5 volts is detected by the amplifier 74 through the diode 72 and the amplifier accordingly provides an output signal delayed by the capacitor 76 to the Reset input of the microprocessor 32. Since the microprocessor 32 is already powered up (as it is connected directly to the 5 volt power supply 30), it recognizes the output signal provided to its Reset input from the amplifier 74 and reprograms itself accordingly.

Figure 8:
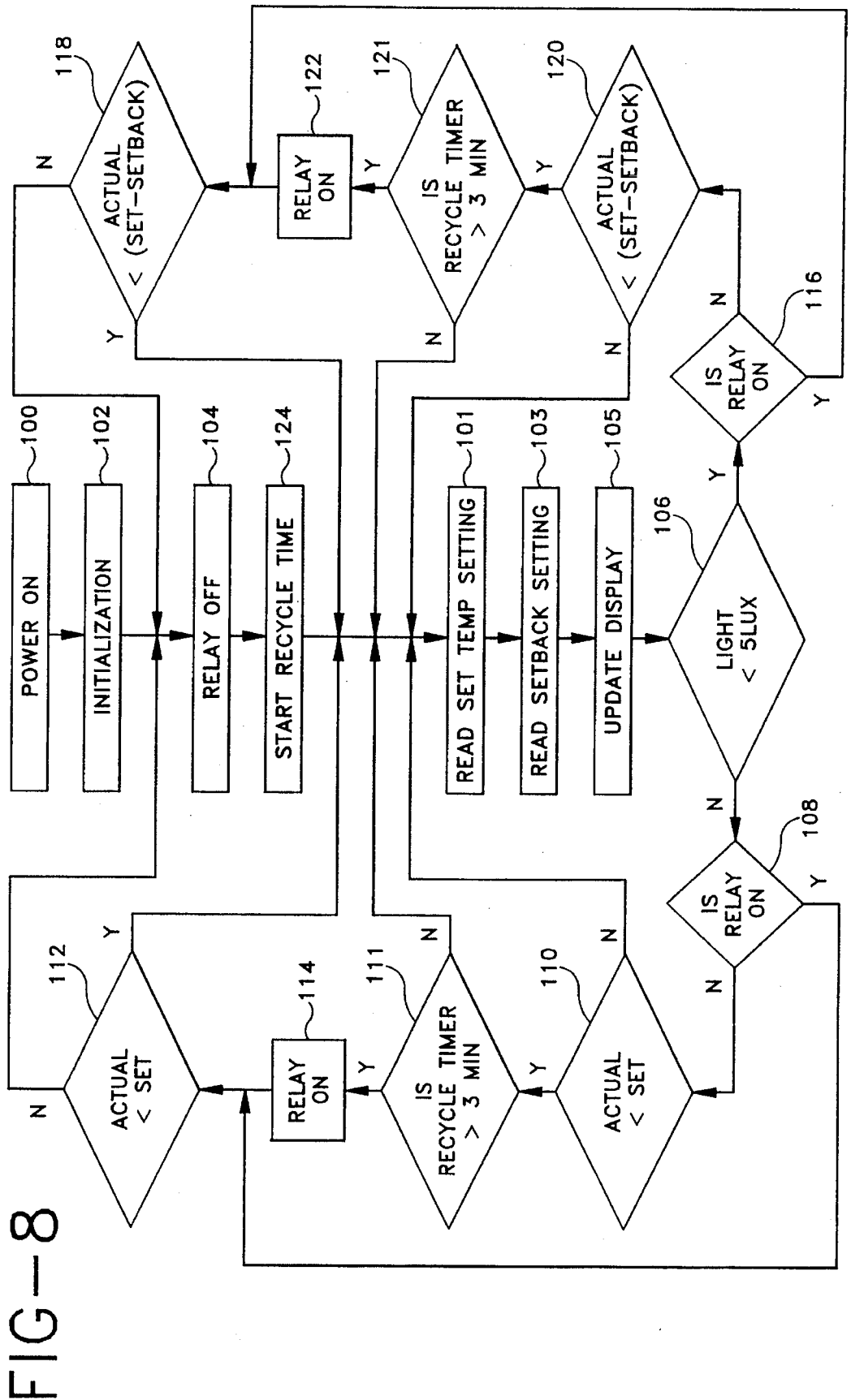
FIG. 8 is a flow chart of the overall operation of the automatic thermostat of the present invention.

FIG. 8 is a flow chart of the overall operation of the automatic thermostat. After power is provided to the thermostat, the thermostat's operational routine starts (Block 100). The thermostat, and in particular the microprocessor of the thermostat, goes through an initialization routine (Block 102) in which it reads the signals from the set temperature potentiometer 34, the setback temperature potentiometer 36, the light sensor 18 and the thermistor 38, and places data corresponding to these signals into its memory. It then ensures that the relay 28 is off (Block 104) and then goes through a read set temperature setting routine (Block 101) and a read setback temperature setting routine (Block 103), as will be explained in greater detail, and then updates the display 40 (Block 105) in accordance with adjustments made to the temperature settings by the operator.

The thermostat next determines if the ambient light level is below a predetermined value, such as 5 lux (Block 106). If the light level is not less than the predetermined level, the thermostat will realize that it is in a daytime or a high light level loop. It then will determine if the relay 28 is on (i.e., whether power is being provided to the heating unit) (Block 108). If the relay is not on, the thermostat will determine if the actual temperature is less than the set temperature (Block 110). If the actual temperature is not less then the set temperature, then there is no need to turn on the heating unit and the thermostat will return to the read temperature setting routines (Block 101,103) and update display step (Block 105) and the decision box of the flow chart which questions whether the light level is less than a predetermined value (Block 106).

If the relay 28 was on (Block 108), the thermostat will then determine whether the actual temperature is less than the set temperature (Block 112). If the actual temperature is less than the set temperature, then there is no need to turn on the relay 28, and the thermostat will return to reading the temperature settings, updating the display and determining whether the light level is less than a predetermined value (Blocks 101,103,105,106). If the actual temperature was not less than the set temperature (Block 112), then the thermostat will turn off the relay (Block 104), which will shut off power to the heating unit. The thermostat will then return to reading the temperature settings, updating the display 40 and the decision box which questions whether the light level is less than a predetermined value (Block 101,103,105,106).

If the light level was low (Block 106) and the relay 28 was not on (Block 108), and if the actual temperature was not less than the set temperature (Block 110), the thermostat will turn the relay on (Block 114) to provide power to the heating unit, and the routine will proceed to the temperature comparison decision in Block 112 described previously.

If the thermostat determines that the light level is less than the predetermined value (Block 106), it will go into the nighttime or low light condition loop, which is very similar to the daytime or high light level loop described previously. The thermostat will determine if the relay 28 is on (Block 116), and if it is, it will then determine if the actual temperature is less than the setback temperature (or minus the setback value) (Block 118). If the actual temperature is not less than the setback temperature, then the thermostat will turn the relay off (Block 104) and proceed to the read temperature setting routines, updating the display and the light level determination (Blocks 101,103,105,106). If the actual temperature was less than the setback temperature (Block 118), and since the relay was on (Block 116), it will proceed through the loop again to the read temperature setting, update display and light level determination steps (Blocks 101,103,105,106).

If the relay 28 was not on (Block 116), then the thermostat will determine if the actual temperature is less than the setback temperature (Block 120). If the actual temperature is not less than the setback temperature, and since the relay is not on (Block 116), there is no need to turn the relay on and the thermostat will proceed to the read temperature settings, update display and light determination steps (Blocks 101, 103,105,106). If the actual temperature is less than the setback temperature (Block 120), then it is necessary to turn the relay on (Block 122) and provide power to the heating unit, and the thermostat will proceed through the loop to the step where it determines whether the actual temperature is less than the setback temperature (Block 118) described previously.

In a preferred form of the invention, the microprocessor 32 may be defined internally with a recycle time delay circuit 78 (FIG. 4). The recycle time delay circuit 78 controls the output signal from the microprocessor to the relay 28 or solid state switch 58 to prevent power from being provided to the heating unit for a predetermined period of time. This time delay is preferably provided in one of two ways, as will be explained.

In one way, when the actual temperature of the room equals the set or setback temperature (depending on whether the thermostat is in the day or night mode), the relay 28 or solid state switch 58 is turned off so that no power is provided to the heating unit. The temperature of the room will rise and then eventually fall below the set or setback temperature setting as the room cools. If the actual temperature falls below the set or setback temperature setting within a predetermined period of time, the recycle time delay circuit 78 of the microprocessor 32 will prevent the relay or solid state switch from re-energizing until after the predetermined time period has elapsed. In this way, the relay (and heating unit) are not recycled on and off so frequently which could damage the heating unit (or the relay) without the recycle time delay circuit.

In another way, the recycle time delay circuit 78 may provide a predetermined time delay after the actual temperature has fallen below the set or setback temperature settings. In other words, the recycle time delay circuit 78 starts the time delay from the time the actual temperature falls below the set or setback temperature setting, to delay the turn on of the heating unit. This is advantageous with rather slowly varying, large capacity heating units having a more capacitive effect, that is, where the temperature differentials in the cycles are not as great. Such a delay would not be noticeable or uncomfortable for the occupants of the room or building, and yet the delay may save on energy costs by not recycling the heating unit on and off as frequently.

Accordingly, such a time delay is shown in the flow chart in FIG. 8. More specifically, the recycle timer 78 is started in Block 124 after the thermostat shuts the relay off (Block 104) and before the read temperature setting routines (Blocks 101,103). In each of the day or night loops, a decision step is included (Blocks 111,121, respectively) in which it is determined whether the recycle timer 78 has been on for greater than a predetermined period of time, for example, 3 minutes. If the predetermined time period has not elapsed (i.e., the timer 78 is on), the relay 28 which controls power to the heating unit is not turned on (that is, Blocks 114,122 are avoided) and the operation of the thermostat flows to the read temperature setting routines (Blocks 101, 103). If the timer 78 is off, which means that the predetermined time period has elapsed, the thermostat will allow the relay 28 to be energized (Blocks 114,122) to provide power to the heating unit.

Another advantageous feature of the thermostat of the present invention is that the display 40 is designed to be user friendly to help the user program the thermostat. When either the set temperature potentiometer 34 or the setback temperature potentiometer 36 is touched, the display 40, which in its normal mode is displaying the actual temperature, will flash and display for a predetermined time period (for example, 2 seconds) the original set or setback temperature setting, even though the potentiometer setting has been changed. After the predetermined time period has elapsed, the display 40 will then show the new temperature setting or setback setting which is being adjusted by the operator. It will continue to display the set temperature setting or setback temperature setting as long as the potentiometers 34,36 (and therefore the settings) are being changed. When the potentiometers have not been readjusted for another predetermined period of time (for example, 7 seconds), the display will then again show the actual temperature setting.

Also, the "actual" "set temp" and "setback" indicators 52,48,50 will illuminate in accordance with whether the display is showing the actual temperature, the set temperature or the setback temperature (or the number of degrees desired to set back from the set temperature) on its two digit display. The illumination of the indicators and segments of the display 40 and the control of the display are all accomplished by the microprocessor 32 of the thermostat.

Figure 9:
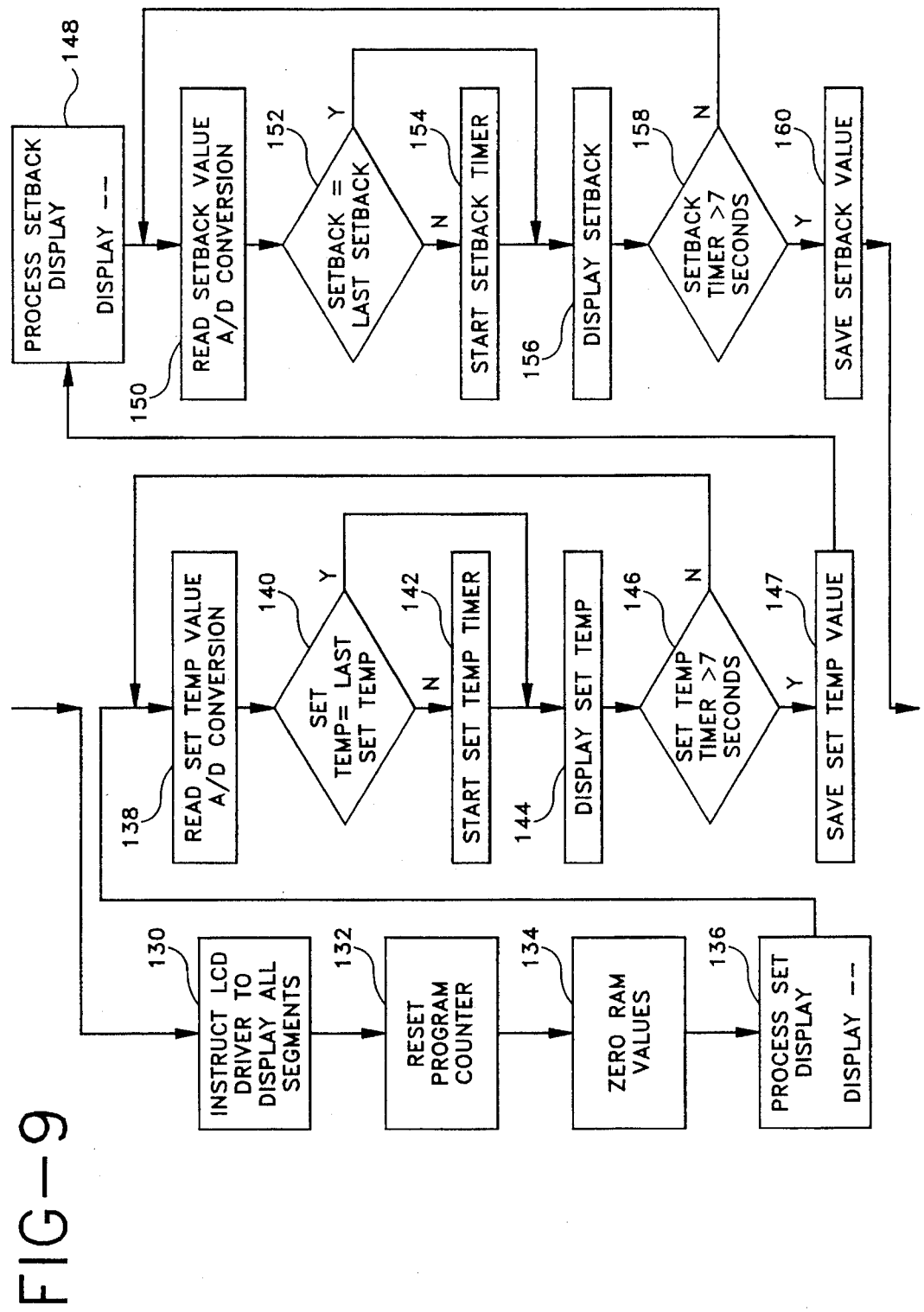
FIG. 9 is a detailed flow chart of the initialization routine of the microprocessor used in the automatic thermostat of the present invention.

FIG. 9 illustrates a detailed flow chart of the initialization routine (Block 102, FIG. 8) of the microprocessor used in the automatic thermostat of the present invention. As shown in FIG. 9, the microprocessor 32, in accordance with the initialization routine, instructs its LCD driver, which is incorporated in the microprocessor, to display all of the segments of the LCD display 40 (Block 130). The purpose of this step is to determine if all of the segments of the display are operational. The operator may view the display 40 to determine if all of the segments are energized. If not, the display may be providing erroneous information to the operator with regard to the set temperature, setback temperature and the actual temperature.

Next, the microprocessor resets its program counter (Block 132). It also initializes whatever values are in its RAM (Random Access Memory) by placing, for example, zeros in the RAM memory (Block 134).

The microprocessor then processes the set display data, which is provided to the LCD display 40, and causes the display to show a dashed line ("- -") to alert the operator that no prior set temperature is stored in memory, as this is the initialization of the thermostat (Block 136).

The microprocessor of the thermostat of the present invention now reads the set temperature signal from the set temperature potentiometer 34, and conducts an analog-to-digital conversion of this signal (Block 138). The microprocessor will then determine if the newly read set temperature value is equal to a previously read set temperature value (Block 140). Because there is no previously read set temperature value upon the initial reading of the set temperature data, the microprocessor will proceed in its routine to the step where it starts a set temperature timer which is internally programmed in and forms part of the microprocessor (Block 142).

As mentioned previously, the thermostat of the present invention will display the set temperature for a predetermined period of time, such as 7 seconds, and if the set temperature potentiometer 34 has not been changed during that time, it will then display the actual temperature. Accordingly, the microprocessor 32 in the thermostat will start the internally programmed set temperature timer (Block 142).

Next, the microprocessor will cause the display to show the set temperature which is set by the operator (Block 144). The microprocessor will also determine if the predetermined time period, such as 7 seconds, has elapsed, or in other words, whether the set temperature timer been on for more than 7 seconds (Block 146). If the timer has not been on for more than 7 seconds, the microprocessor will return to reading the set temperature signals provided to it (Block 138). It will then determine if the newly read set temperature value is equal to the previously read set temperature value (Block 140). If the set temperature potentiometer 34 has not been adjusted by the operator between readings by the microprocessor, then the set temperature timer will not be restarted, as Block 142 is avoided in the routine, and the thermostat will continue to display the set temperature set by the operator (Block 144). As long as the operator does not adjust the set temperature potentiometer 34, the set temperature will be continuously displayed for up to 7 seconds.

If 7 seconds has elapsed (Block 146), the microprocessor will store the set temperature data in its memory (Block 147) and will proceed to processing the setback display data which is to be provided to the display 40, and the thermostat will display a dashed line as it did in Block 136 to indicate to the operator that no previous setback temperature data is stored in memory (Block 148). The microprocessor 32 will then proceed in the same manner as it did with the set temperature setting in Blocks 138–147.

More specifically, the microprocessor 32 will read in the setback temperature signals from the setback temperature potentiometer 36, and conduct an analog-to-digital conversion of this signal (Block 150). The microprocessor will then determine whether the setback temperature data which it just read is equal to the previously read setback temperature data (Block 152). Because this is the first setback temperature data being read by the microprocessor 32, the microprocessor will proceed to starting a setback timer, which is internally programmed in the microprocessor, which will measure a predetermined time period, such as 7 seconds, in the same manner as the set temperature timer. Both the setback and set temperature timers form part of the microprocessor.

Next, the thermostat will display the setback temperature which is set by the operator (Block 156). The microprocessor will then determine if the setback timer has been on for more than 7 seconds, i.e., whether the predetermined time period has elapsed (Block 158). If 7 seconds has not elapsed, the microprocessor will again read the setback temperature signal from the setback temperature potentiometer 36 (Block 150), and determine if the newly read setback temperature data is equal to the previously read setback temperature data (Block 152). If the two are equal, this means that the potentiometer 36 has not been adjusted by the operator. Therefore, the microprocessor will wait to see if the 7 second period has elapsed without the setback temperature potentiometer being readjusted by the operator. Accordingly, if the potentiometer 36 has not been readjusted, the thermostat will avoid restarting the timer (Block 154) and will continue to display the setback temperature setting (Block 156) until 7 seconds has elapsed (Block 158). If 7 seconds has elapsed, the microprocessor will save the final setback temperature value by storing this value in its memory (Block 160). This will complete the initialization routine that the microprocessor and thermostat of the present invention undergo every time a power failure occurs.

Figure 10:
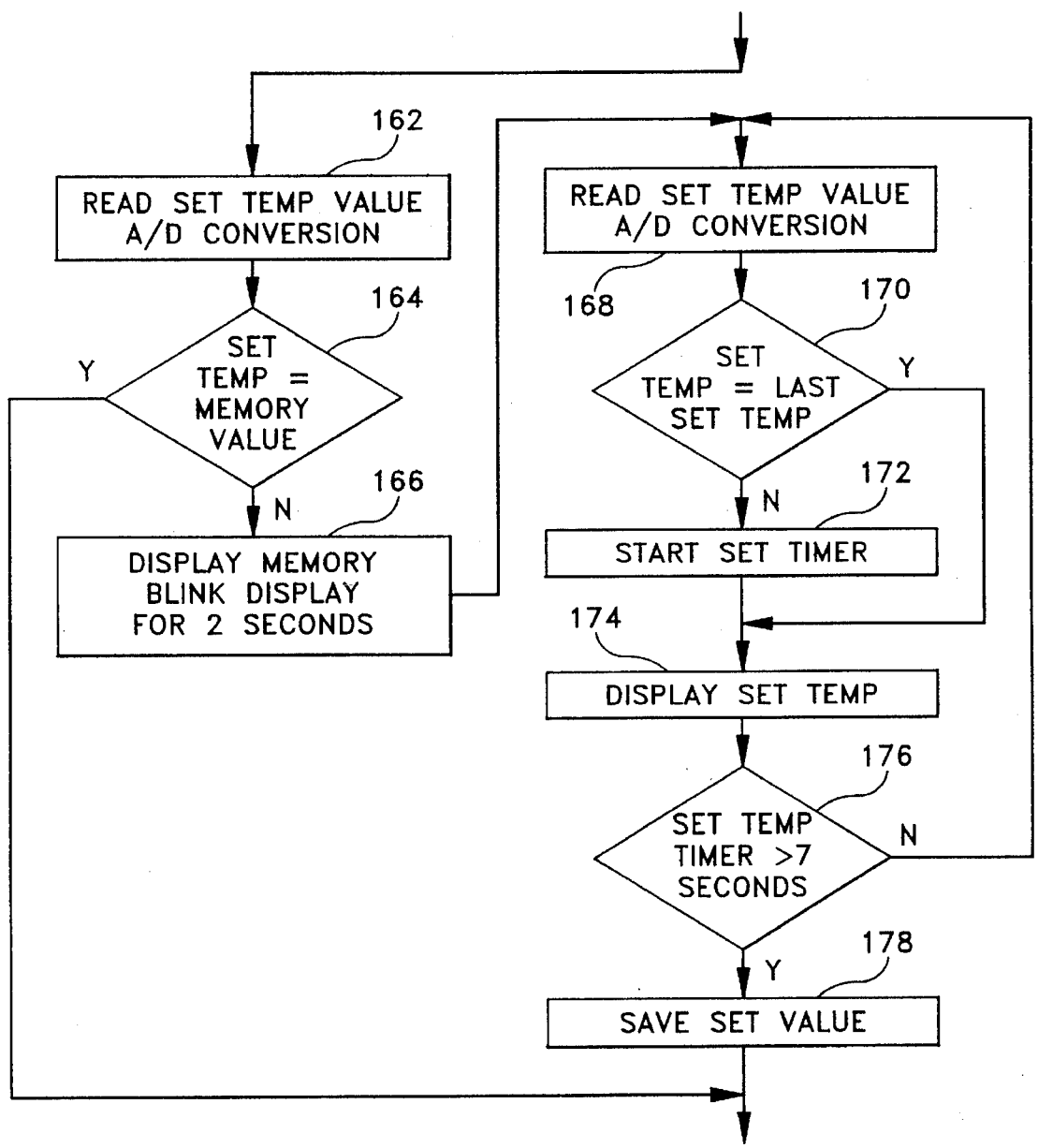
FIG. 10 is a detailed flow chart of the read set temperature setting routine of the microprocessor used in the automatic thermostat of the present invention.

FIG. 10 shows a detailed flow chart of the read set temperature setting routine of the microprocessor of the automatic thermostat of the present invention. As shown in FIG. 10, the microprocessor 32 will read the set temperature signal provided to it and conduct an analog-to-digital conversion of this signal (Block 162). The thermostat will then determine whether the set temperature value which was just read is equal to that which is stored in its memory from a previous reading (Block 164). If the newly read set temperature value is equal to that which is stored in memory, there is no need to update the memory and the microprocessor proceeds out of the set temperature routine. However, if the newly read set temperature value is different from a previous value stored in memory (Block 164), which means that the operator has readjusted the set temperature potentiometer 34, the thermostat will not immediately display the new set temperature value, but rather will display the previously stored set temperature value for 2 seconds while blinking the display (Block 166). As mentioned previously, this facilitates operation of the thermostat by the operator. By the operator merely adjusting the dial of the set temperature potentiometer 34, the display will automatically switch from displaying the actual temperature to the set temperature which the operator previously set prior to his most recent adjustment of the set temperature, so that the operator can see what that previous setting was. The previous setting is displayed preferably for 2 seconds or some other predetermined period of time, even though the set temperature potentiometer 34 has been adjusted to a different set temperature.

The microprocessor 32 will read the new set temperature signal from the potentiometer 34 and conduct an analog-to-digital conversion of the signal (Block 168). As it did in the initialization routine (FIG. 9), the microprocessor will determine if the newly read set temperature value is different from the previously read set temperature value (Block 170), and if it is not, it will restart the temperature set timer of the microprocessor (Block 172) and display the new set temperature adjusted by the operator (Block 174). If the set temperature timer has been on for less than 7 seconds (Block 176), the microprocessor will return to reading the set temperature signal from the potentiometer 34 and converting that signal into digital data (Block 168). If the set temperature potentiometer has not been changed such that the newly read set temperature data is the same as the previously read data (Block 170), the temperature set timer will not be restarted (Block 172) and the set temperature will continue to be displayed (Block 174). If the set temperature timer has been on for more than 7 seconds without the set temperature potentiometer 34 being readjusted (Block 176), the microprocessor 32 will save the set temperature data by storing it in its memory (Block 178) and will proceed to the read setback temperature setting routine shown in FIG. 11.

Figure 11:
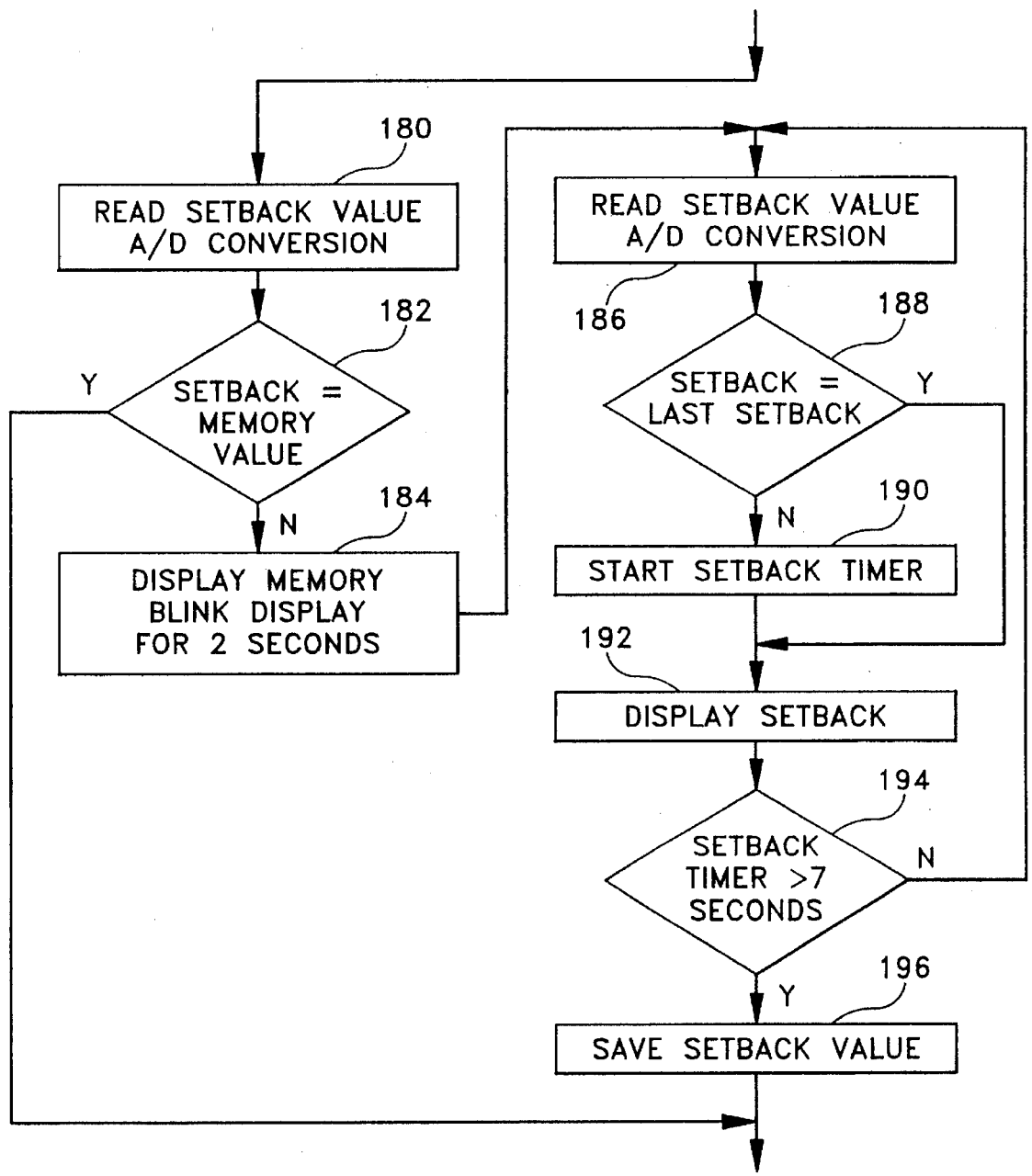
FIG. 11 is a detailed flow chart of the read setback temperature setting routine of the microprocessor used in the automatic thermostat of the present invention.

The read setback temperature setting routine shown in FIG. 11 and performed by the microprocessor is the same as the read set temperature setting routine shown in FIG. 10 and described previously. The microprocessor 32 reads the setback temperature signal from the setback temperature potentiometer 36 and conducts an analog-to-digital conversion of this signal (Block 180), and will then determine whether the setback temperature data just read by the microprocessor is the same as the previous data stored in its memory (Block 182). If the data is the same, there is no need to update the memory and the microprocessor exits the read setback temperature setting routine. However, if the newly read setback temperature data is different from that which is stored in memory, the old data stored in memory will be displayed for 2 seconds while the display 40 is blinked (Block 184). The microprocessor then proceeds into a routine where the signal from the setback temperature potentiometer 36 is continuously monitored for a predetermined period of time.

More specifically, the setback temperature signal from the setback temperature potentiometer 36 is read and the microprocessor conducts an analog-to-digital conversion of this signal to convert it to digital data (Block 186). This newly read setback temperature data is compared to that which was previously stored in memory (Block 188) and, because the two are not the same, the setback temperature timer is restarted, as in the initialization routine (FIG. 9) (Block 190). The thermostat then displays the newly read setback temperature (Block 192).

If the setback timer has been on for less than a predetermined period of time, for example, 7 seconds (Block 194), then the microprocessor 32 again looks at the signal from the setback temperature potentiometer 36 and converts that signal into its digital equivalent (Block 186). If the setback temperature potentiometer has not been adjusted since the last time the signal has been looked at, the newly read setback temperature data will be equal to the previously read setback temperature data (Block 188) and the setback timer will not be restarted (Block 190). The setback temperature setting will continue to be displayed (Block 192). This loop continues for 7 seconds (Block 194) as long as the operator has not readjusted the setback temperature potentiometer 36 within the 7 second window.

If 7 seconds have elapsed and the potentiometer 36 has not been adjusted, then the microprocessor 32 will save the most recently read setback temperature data and store this in its memory (Block 196) and will exit from the setback temperature setting routine.

The automatic thermostat of the present invention is adapted to automatically reprogram itself after a power outage without the need of back-up batteries or storage devices. It is easily programmable by the operator, who can monitor the changes to the set temperature and setback temperature settings through the display. The display 40 also conveniently displays the actual temperature in the room where the thermostat is located and automatically switches to the original temperature and setback temperature settings as soon as the operator adjusts one of the knobs of the potentiometers 34,36 so that the operator can see what the original setting was even though the operator changed the setting on the potentiometer.

As mentioned previously, the setback temperature may be set by the setback temperature potentiometer 36 in one of two ways. The setback temperature potentiometer may either directly adjust the actual set back temperature, for example, 60°, or maybe use to set the number of degrees in temperature which the user would like to set back from the daytime "set" temperature during nighttime or hours when the room is not in use. If the potentiometer 36 is used to adjust the latter, that is, the number of degrees, for example 15° which the set temperature is set back for nighttime conditions, the microprocessor 32 will cause the setback value, once set, to always track the set temperature, even if the set temperature is adjusted. For example, a setback temperature setting of 15° will always give 15° of setback from the set temperature. If the set temperature is 75°, the actual setback temperature will be 15° lower, or 60°. If the set temperature potentiometer 34 is readjusted to 70°, the same 15° setback will provide a setback temperature of 55°.

The automatic thermostat of the present invention will also react to the ambient light conditions in the room in which it is situated to provide day/night temperature settings. Also, the light sensor 18 used on the thermostat may be controlled in sensitivity by directing the window 24 of the hood 22 towards or away from a light source. The thermostat is microprocessor controlled, and can provide full power or reduced, proportionally controlled power to the heating unit. Also, the built-in recycle time delay circuit 78 saves energy and minimizes wear and tear on the heating unit and relay used in the thermostat.

The automatic thermostat of the present invention has been previously described as controlling a heating unit. However, it is envisioned to be within the scope of this invention to have the automatic thermostat control an air conditioning unit, alone or in combination with a heating unit, under substantially the same principles of operation described previously. The set temperature setting is the normal daytime temperature that the operator would like to have the room cooled to by the air conditioning unit. The setback setting is the higher (or lower, if desired) nighttime temperature selected by the operator.

For operating an air conditioning unit, the automatic thermostat has a recycle time delay circuit 78 (FIG. 4) which is preferably internally programmed in and forming part of the microprocessor 32 and which prevents the air conditioning unit from being on for less than a predetermined period of time, for example, 15 or 20 minutes, so that the compressor and unit will run more efficiently. The recycle time delay circuit 78 may also be used to ensure that the compressor of the air conditioning unit is not recycled on and off too frequently in order to prevent damage to the unit.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An automatic thermostat, which comprises:

a temperature sensor, the temperature sensor providing a temperature sensor signal corresponding to a sensed actual temperature;

means for setting a set temperature, the set temperature setting means providing a set temperature signal;

means for setting a setback temperature, the setback temperature setting means providing a setback temperature signal;

a microprocessor, the microprocessor being responsive to the set and setback temperature signals and to the temperature sensor signal and generating first and second output signals in response thereto;

means for detecting a power outage, the power outage detecting means generating an output signal in response to a power outage;

a display, the display being responsive to the first output signal from the microprocessor and displaying information corresponding to a set temperature, setback temperature and actual temperature in response thereto; and means for controlling power to at least one of a heating unit and an air conditioning unit, the power controlling means being responsive to the second output signal from the microprocessor and selectively controlling power to the at least one of a heating unit and an air conditioning unit in response thereto;

wherein the microprocessor is further responsive to the output signal from the power outage detecting means and automatically reprograms itself in response thereto and in further response to the set temperature signal and setback temperature signal.

2. An automatic thermostat as defined by claim 1, which further comprises:

an ambient light sensor, the ambient light sensor providing an ambient light signal corresponding to a sensed ambient light level, the microprocessor being responsive to the ambient light signal and providing the second output signal in response thereto, the power controlling means being responsive to the second output signal and thereby controlling power to the at least one of a heating unit and an air conditioning unit in response to the sensed ambient light level.

3. An automatic thermostat as defined by claim 2, which further comprises:

means for adjusting the sensitivity of the ambient light sensor.

4. An automatic thermostat as defined by claim 3, wherein the sensitivity adjusting means includes a moveable cover disposed in proximity to the ambient light sensor, the moveable cover being adjustable to allow a desired amount of ambient light to be received by the ambient light sensor.

5. An automatic thermostat as defined by claim 4, wherein the moveable cover includes a window formed therein, the cover being moveable so that the window may be directed in a desired direction.

6. An automatic thermostat as defined by claim 1, wherein the display provides first display information upon a change in one of the set and setback temperature signals, the first displayed information indicating one of the set and setback temperatures prior to the change; and wherein the display provides second displayed information, the second displayed information being automatically displayed after a first predetermined time period after the first displayed information, the second displayed information indicating one of a new set temperature and a new setback temperature occurring after the change in one of the set and setback temperature signals.

7. An automatic thermostat as defined by claim 6, wherein the display further provides a third displayed information after a second predetermined time after the second displayed information, the third displayed information indicating the actual temperature.

8. An automatic thermostat as defined by claim 6, wherein the display further includes an indicator, the indicator indicating that the first displayed information corresponds to one of a set temperature and a setback temperature.

9. An automatic thermostat as defined by claim 7, wherein the display further includes an indicator, the indicator indicating that the third displayed information corresponds to the actual temperature.

10. An automatic thermostat as defined by claim 1, wherein the power controlling means includes an electronic proportional control switching device, the proportional control switching device being responsive to the second output signal from the microprocessor and providing a predetermined amount of power to the at least one of a heating unit and an air conditioning unit in response thereto.

11. An automatic thermostat as defined by claim 1, which further comprises:

means for selectively providing power to the microprocessor, the power providing means being responsive to the output signal from the power outage detecting means and selectively providing power to the microprocessor in response thereto.

12. An automatic thermostat as defined by claim 1, which further comprises:

means for delaying the output signal from the power outage detecting means, the delay means being responsive to the output signal from the power outage detecting means and providing a delayed signal in response thereto, the microprocessor being responsive to the delayed signal.

13. An automatic thermostat as defined by claim 1, which further comprises:

a recycle time delay circuit, the recycle time delay circuit being operatively coupled to the power controlling means and operatively controlling the power controlling means to prevent the power controlling means from allowing power to be provided to the at least one of a heating unit and an air conditioning unit for a predetermined period of time.

14. A method of displaying at least one of a set temperature and a setback temperature setting on a display of a thermostat, the thermostat having an operator adjustable set temperature setting means and an operator adjustable setback temperature setting means and further having means for sensing an actual temperature, the method comprising the steps of:

(a) sensing the operator adjustment of at least one of the set temperature setting means and the setback temperature setting means; and (b) upon sensing the operator adjustment in step (a), displaying for a first predetermined period of time at least one of the set temperature prior to operator adjustment and the setback temperature setting prior to operator adjustment.

15. A method as defined by claim 14, which further comprises the step of:

(c) after displaying the at least one of the set temperature and the setback temperature setting in step (b), displaying for at least a second predetermined period of time at least one of a new set temperature corresponding to the operator adjustment of the set temperature means and a new setback temperature setting corresponding to the operator adjustment of the setback temperature setting means.

16. A method as defined by claim 15, which further comprises the step of:

(d) after displaying at least one of the new set temperature and the new setback temperature setting for the at least second predetermined period of time, displaying the actual temperature.

* * * * *